(No Model.)

E. L. METCALF.
DRIVING CHECK FOR HORSES.

No. 323,948.  Patented Aug. 11, 1885.

Witnesses
J. N. Piper.
Ernest B. Pratt.

Inventor.
Erastus L. Metcalf.
by R. H. Eddy att'y

UNITED STATES PATENT OFFICE.

ERASTUS LOVELL METCALF, OF FRANKLIN, MASSACHUSETTS.

DRIVING-CHECK FOR HORSES.

SPECIFICATION forming part of Letters Patent No. 323,948, dated August 11, 1885.

Application filed June 8, 1885. (No model.)

*To all whom it may concern:*

Be it known that I, ERASTUS LOVELL METCALF, of Franklin, in the county of Norfolk, of the Commonwealth of Massachusetts, have invented a new and useful Improvement in Driving-Checks for Horses; and do hereby declare the same to be described in the following specification, and represented in the accompanying drawings, of which—

Figure 1:
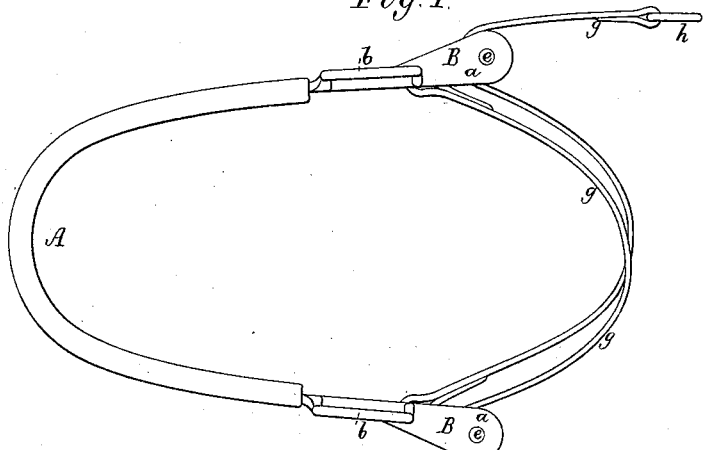
Figure 2:
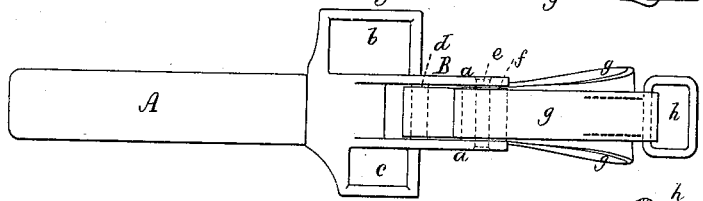
Figure 3:
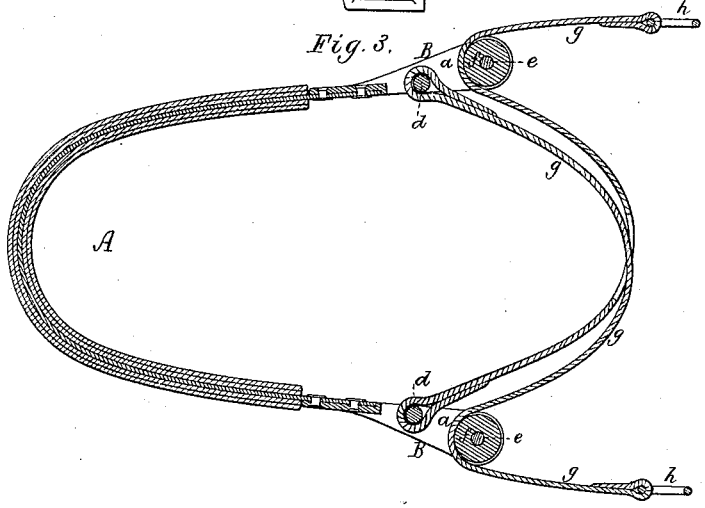
Figure 4:
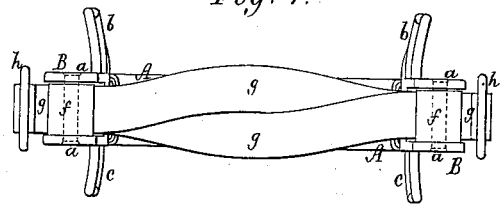

Figure 1 is a top view, Fig. 2 a side elevation, Fig. 3 a horizontal and longitudinal section, and Fig. 4, a rear view, of a driving-check containing my improvement or invention, the nature of which is defined in the claims hereinafter presented.

The driving-check, which is to answer the purpose of a bit as used in the mouth of a horse, is of the class of that shown and described in Letters Patent No. 319,006, dated June 2, 1885, and granted to me. It is to encompass the head of the animal just above his mouth.

In the drawings, A denotes a nose-band in the form in top view of a semi-ellipse or bow, as represented, or approximately so, it terminating at each of its ends in a fork, B, having two flat prongs, *a a*. There project from each of the forks two eyes, *b c*, one extending upward and the other downward from it. The two upper eyes are for connecting the nose-band to the two hanging straps of a head-stall, as a common bit is held thereto. The two lower eyes are for attachment of a martingale to the nose-band. Between the two prongs of each fork there are two cylindrical bars, *d* and *e*, extending from one to the other of such prongs and fixed to them, the outermost bar having upon and concentric with it, and to freely revolve on it, a friction-roller, *f*. There is fastened to each inner bar, *d*, one of two straps, *g g*, the strap fastened to each fork being extended across the nose-band and through the space between the friction-roller and the bar *d* of the opposite fork, and provided at its outer end with a ring, *h*, for buckling to it one of a set or pair of driving-reins. The two straps, when arranged as represented, cross one another where between the forks of the nose-band.

When the nose-band is in place on the head of a horse, by pulling on both reins not only will such nose-band be drawn backward and tightly compressed against the head, but the two rein-straps *g g* will at the time be drawn hard against the rear part of the head above the lower lip, the whole tending effectually to check or stop the horse, provided at the time he be advancing. By pulling either rein the horse may be turned as with a bit.

I do not herein claim a driving-check composed of a nose-band, a clamp, and loops, arranged and applied as shown in the specification and drawings of the aforesaid patent; nor do I claim a driving-check composed of a jaw-holder to bear against the under jaw, a nose-band to cross the nose and extend through cheek-pieces supported by the head-stall, all being as represented in the United States Patent No. 200,781, for my invention differs therefrom in being a single bow to extend across the nose of the animal, and besides it has no jaw-holder to encompass his lower jaw nor any nose-bridge to bear on the nose and to receive straps going about the nose.

I claim—

1. The combination of the nose-band and its forks provided with the cross-bars and friction-rollers, as described, with the two rein-straps extending in opposite directions between the forks and crossing each other, and each connected with one and going through the other of such forks, all being substantially and to operate as and for the purpose as set forth.

2. The combination of the nose-band bow, formed essentially as described, with two straps fastened to it near its ends and extending in opposite directions across and through it and crossing each other in their passage across it, all being substantially as set forth.

ERASTUS LOVELL METCALF.

Witnesses:
GEO. A. PERKINS,
ERNEST B. PRATT.